July 24, 1928.
J. PARKHILL
VEHICLE SPRING
Filed Jan. 20, 1926
1,678,526
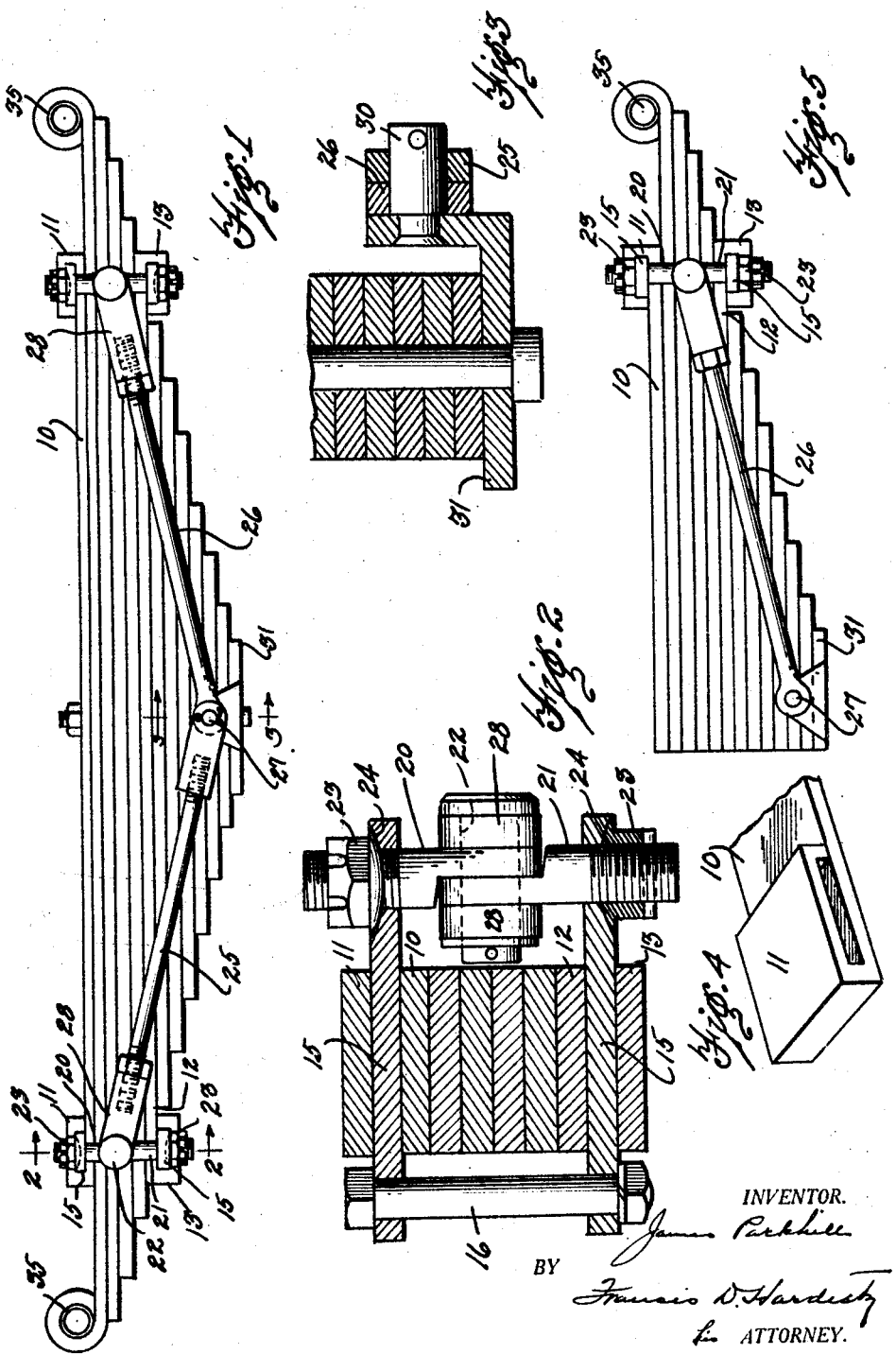
INVENTOR.
James Parkhill
BY
Francis D. Hardesty
ATTORNEY.

Patented July 24, 1928.

1,678,526

UNITED STATES PATENT OFFICE.

JAMES PARKHILL, OF FLINT, MICHIGAN.

VEHICLE SPRING.

Application filed January 20, 1926. Serial No. 82,411.

The present invention relates to vehicle springs and particularly to springs involving means to modify the spring action.

Among the objects of the invention is a spring in which the deflection in either direction from a neutral position is retarded.

Another object is such a spring in which the retarding action is increased as the deflection is increased and vice versa.

With these and other objects in view as will more clearly hereinafter appear to those skilled in the art, the invention consists broadly in a spring provided with means to press together the leaves thereof when the spring is deflected and to increase such pressure as the deflection is increased.

Reference should be made to the accompanying drawing, in which:

Fig. 1 shows in elevation a half elliptic spring involving the invention;

Fig. 2 is a section thereof on line 2—2 of Fig. 1;

Fig. 3 is a section on line 3—3 of Fig. 1;

Fig. 4 is a detail of an end of one of the special leaves;

Fig. 5 is a view similar to Fig. 1 but showing a quarter elliptic spring.

In the drawings, the spring proper is shown as of the usual form but with a superposed shorter leaf 10 provided with eyes 11. The spring also has one of its intermediate leaves substituted by a leaf 12 similar in form and length to leaf 10, leaf 12 being also provided with eyes 13.

Passing through eyes 11 and 13 transversely of and at both ends of the spring are the plates 15 each provided at one end with a hole through which extends a bolt 16 adapted to secure each pair together on one side of the spring. The other ends of plates 15 are secured together by toggle joints formed of the two members 20 and 21, each of which consists of a shank threaded at one end and having an eye at the other, secured together by pin 22 and having threaded thereon the nuts 23. Nuts 23 have spherical under faces 24 adapted to seat in corresponding spherical seats in the ends of plates 15.

Connected to the joints of the toggles by means of the pins 22 are two rods 25 and 26, extending therefrom to a common pivotal anchorage at 27, which is displaced above or below the center of deflection of the spring. These rods are preferably provided with yokes 28 at their toggle ends to embrace the eyes of members 20 and 21 and the other ends of the rods are provided with eyes adapted to slip over a pin 30 secured to a short plate 31 secured beneath the spring.

It is, of course, understood that the spring will be connected at its eyes 35, through suitable shackles, to a load and that the central portion will be secured in suitable fashion to a vehicle axle, and that spring clips to maintain alinement of the leaves may be used if desirable or necessary.

The action of the device is as follows. Plates 15 are maintained at a fixed distance from the center of the spring by leaves 10 and 12 and eyes 11 and 13. The toggle center joints are maintained a fixed distance from point 27 by rods 25 and 26 and point 27 is displaced preferably below the center of the four sided figure bounded by plates 10 and 12 and the two toggles. Therefore, any deflection downwardly of the ends of the springs will cause the rods 25 and 26 to move the centers of the toggles outwardly and thereby bring together the plates 15 and increase the pressure on the leaves and consequently the inter-leaf friction. Deflection upwardly produces the same result by causing the toggles to be moved inwardly out of line.

The same results may be obtained with quarter elliptic springs as indicated in Fig. 5. In this figure, such a spring is shown with only one toggle and one distance rod.

Having now described the invention and the preferred forms of embodiment thereof, it is to be understood that said invention is not to be limited to the specific details herein described and illustrated but only by the scope of the claims which follow.

I claim:—

1. A leaf spring provided with means embracing some of its leaves at a fixed distance from the center of the spring, said means including a toggle joint normally in alinement, and a distance rod connected to the center of said joint and to a fixed point vertically displaced from the center of deflection of the spring.

2. In a leaf spring, means embracing some of the leaves said means including a toggle joint, a spring leaf having means to fix said embracing means at a predetermined distance from the center of deflection of the spring, and means to fix the distance between the center of the toggle joint and a point below the center of deflection of the spring.

3. In a leaf spring, a superposed leaf having an eye in its free end and of less length than said spring, an intermediate leaf also having an eye in its free end and of the same length as said superposed leaf, a pair of transverse plates passing through said eyes and bolted together at one end, a toggle joint securing together the other ends of said plates, and a rod secured at one end to the joint of said toggle and at its other end fixed pivotally at a point vertically displaced from the center of deflection of the spring.

JAMES PARKHILL.